Patented June 17, 1930

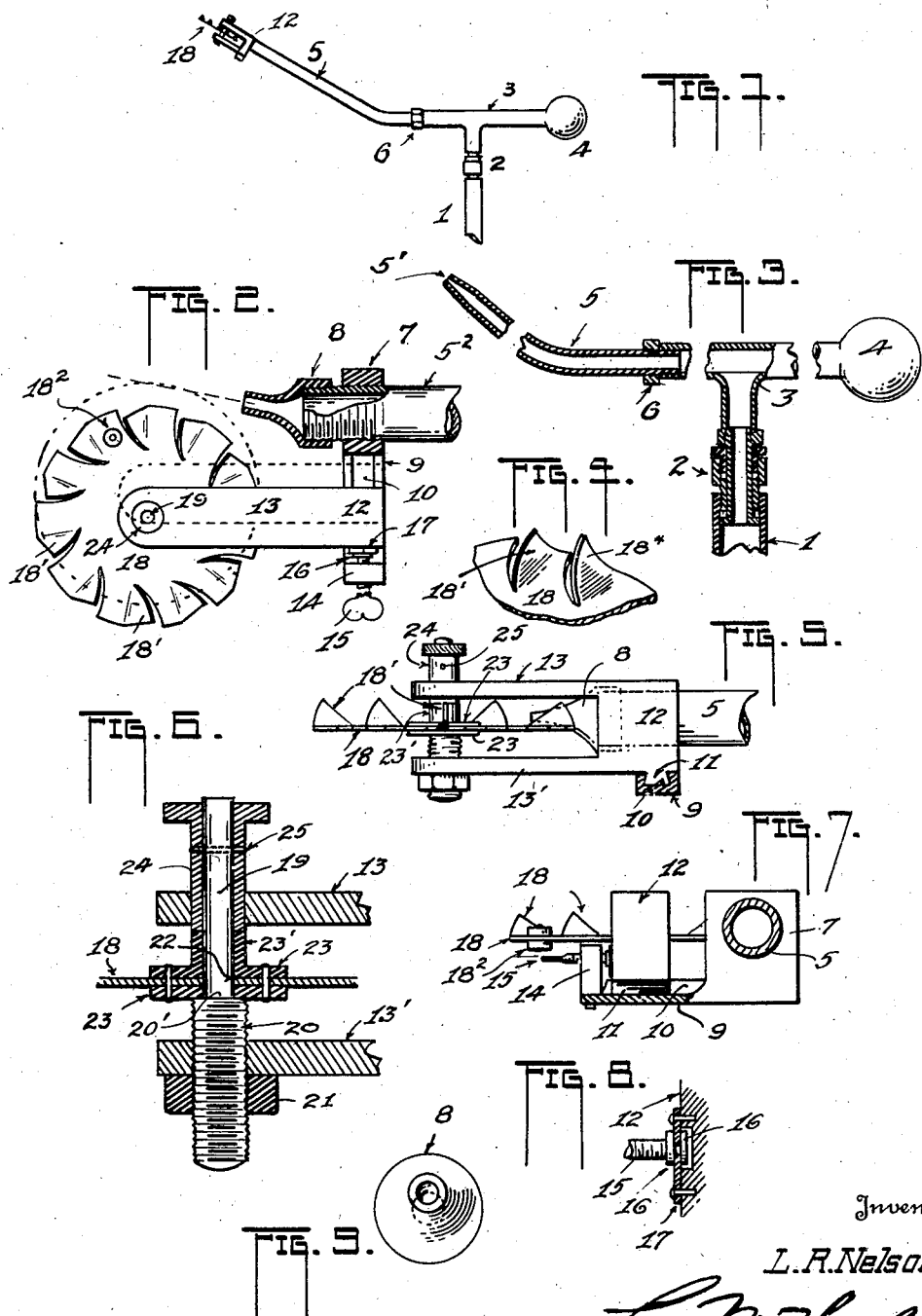

1,763,979

UNITED STATES PATENT OFFICE

LEWEN R. NELSON, OF PEORIA, ILLINOIS

SPRINKLER

Application filed November 19, 1926. Serial No. 149,311.

This invention relates to revolving lawn sprinklers, of that type particularly adapted for sprinkling large areas such, for example, as lawns of wide expanse, and golf-course greens. The structure involves a rotatably mounted water supply pipe terminating in a nozzle, and a water distributing and spraying wheel adapted to be rotated by a stream discharged from said nozzle.

The main object of my invention is to provide a novel form of sprinkler which includes an arm mounted upon and adapted to rotate with respect to a support from which it is supplied with water under pressure, said arm carrying a wheel adapted to be rotated by the discharge of water thereagainst and to itself break up and spray the water, said wheel being so arranged that during rotation it will set up vibrations in the arm, such vibrations being transferred to the point of support of the latter whereby to keep the parts at the swivel mounting from frictionally binding so that they may freely turn with respect to one another.

Another object is to provide a swiveled water supply arm with a wheel to receive water from said arm, and to provide for adjusting the wheel with respect to the stream whereby to obtain different sprinkling results.

Still another object is to provide a swiveled water supply arm with an unbalanced water distributing wheel, a nozzle arranged to discharge water upon such wheel, and means to provide for adjustments of the wheel with respect to the water stream whereby different sprinkling effects may be produced, and further that by other adjustments different rates of rotation of the arm may be obtained.

In the appended drawing is shown a form my invention may take.

Figure 1 is a side elevation of the sprinkler showing the manner of its mounting.

Figure 2 is a plan of a water distributing wheel and the manner of supporting it, together with a modified form of water discharge nozzle.

Figure 3 is a longitudinal vertical section of part of a water supply arm showing a swivel mounting therefor.

Figure 4 shows in perspective a part of the wheel shown in Figure 2 but of slightly modified form.

Figure 5 is a side elevation of the structure shown in Figure 2.

Figure 6 is a sectional elevation of parts in Figure 5 produced on a larger scale showing means for adjusting the wheel.

Figure 7 is an end elevation of parts shown in Figures 2 and 5.

Figure 8 is a section showing on a larger scale some of the details of parts illustrated in Figure 7, and Figure 9 is an end elevation of a nozzle.

In Figures 1 and 3 a supporting standard is designated at 1 through which water under pressure is conveyed to the sprinkler now to be described. Mounted on said standard by a suitable swivel arrangement denoted as a whole at 2, not requiring a detailed description herein since not new in itself, is the stem of a hollow T-fitting 3 having at one end a weight 4 for counter-balancing a water supply arm 5, and its parts if desired. The said arm may be screwed into such fitting and may be provided with a lock-nut 6 for securing it in any desired position with respect to said fitting, and said arm 5 is preferably upwardly extended at an angle from the fitting 3, and has a discharge opening 5'. Carried upon the free upper end of the arm is a head 7 which includes an arm 9, for example, which may have a dove-tail guide-way 10 therein, for example, Figures 5 and 7, to receive an extension 11 of corresponding form as part of a member 12 having two arms 13, 13' extending therefrom substantially paralleling the arm 5² and 5 as shown in Figures 2 and 5 respectively.

The member 12 is adapted to be positively adjusted in the direction of the said arm 5 and this may be accomplished in a number of different ways one of which is shown herein as an example. That is to say, affixed to the free end of the arm 9 of the head 7 is a part 14 through which extends a thumb-screw 15 whose inner end carries a pair of spaced heads 16, for example, Figure 8, a plate 17 lying between the heads and secured to the member 12.

Positioned between the extremities of the arm 13, 13' is a wheel 18 adapted to be rotated by a stream of water issuing from an adjustable nozzle 8 at the discharge end of the arm 5 as may be understood from an inspection of Figure 2 which nozzle, however, may be constricted end of the arm itself, Figure 3. The manner of mounting the wheel is best shown in Figure 6 wherein 19 is a stem having a threaded enlargement 20 to screw through the arm 13', the same receiving a lock-nut 21 adapted to bear against said arm. The wheel 18 has a central hole 22 to permit the stem 19 to pass through it. At each side of and secured to the wheel is a plate 23, the lower one bearing upon the shoulder 20' of the enlargement 20 of the stem 19, the upper plate 23 having a sleeve portion 23' adapted to abut the end of a sleeve 24 secured on said stem 19 as by a pin 25 for example. The purpose of the structure just described, or an equivalent thereof, is that the wheel 18 may be adjusted to different positions at right angles to its own plane and with respect to the water stream discharged from the nozzle 8. It may be seen that by loosening the lock nut 21 the stem 19 may be turned on its threads in the arm 13' to move the wheel in either direction between the arms 13, 13' which changes the position of the wheel with respect to the opening of the nozzle. The wheel, which may be a stamping, has a series of upturned vanes 18' opposed to the water-stream in whose path they lie to a greater or lesser extent. And, as stated earlier herein, since it is the purpose to set up vibration in the arm for transfer to the swivel 2 I may secure a weight $18^2$ to the wheel Figures 2 and 7, thus unbalancing it. Or, as in Figure 4, I may take one or more of the vanes $18^4$ higher than the others and thus individually heavier than said others so that the streams which may strike most of the veins lightly will give a greater force to the wheels momentarily when it strikes a vane of such higher form, thus imparting a somewhat irregular or erratic movement to the wheel, so that there will be consequent vibration. The weight of the arm 5 with its parts as before stated may be balanced by the weight 4 so that the sprinkler can turn more freely on the swivel at 2 than otherwise assisted in any case by the vibrations.

In the operation of the sprinkler the water issuing from the nozzle 8 strikes the vanes 18' of the wheel 18 causing rotation of the latter. Part of the stream in striking the vanes is finely broken up and sprayed over a considerable territory while the great body of such stream travels beyond the wheel in a more or less broken form, being more or less solid according to the extent to which it may have been affected by the wheel. In order to adjust the degree of impingement of water upon the vanes, according to the results desired, the wheel 18 is adjusted between the arm 13, 13' as already described, it is possible to make adjustments to a great nicety. Again, due to the fact that the wheel can be adjusted in its own plane through the manipulations of the thumbscrew 15 the periphery of the wheel may be adjusted to the stream. Thus due to the ability to adjust the wheel in two planes at right angles to one another various results are possible. The rate of rotation of the arm 5 on its swivel 2 may be varied in two different ways, it being clear that the slower the rotation the farther will the main stream be thrown. On the other hand, as rotation is faster the stream will fall shorter due to greater breaking up of such stream, as its meets the air. I may change this rate of rotation in either of two ways. One of these is to loosen the lock-nut 6 of the arm 5 and turn the latter on its axis to a greater or less angle with respect to the plane of rotation of said arm. Naturally as the projected stream approaches the plane of rotation the movement of the arm on the swivel will be faster. The other method is that of providing a nozzle whose discharge opening is offset from the center thereof as shown in Figures 2 and 9. By rotating the nozzle upon the arm 5 of the axis of the opening thereof will swing on a circle denoted by the dotted line Figure 9. Since the direction of stream discharge is thus changed the adjustments of the wheel 18 with respect to the stream may be made in the manner previously described to bring its vanes into proper position.

A certain amount of vibration in the sprinkler is desirable where an arm such as 5 of the type of sprinkler herein named is mounted on a swivel in order that even at the slowest rotation of the said arm there will be no cessation of that rotation. Therefore, to insure steady and continued action and overcome any slight resistance or binding at the swivel the unbalanced wheel is provided either by means of the weight or by extending one or more of said vanes $18^4$ as described, thereby providing for an irregular or erratic rotation of such wheel.

In some of the claims I shall use the term "unbalanced" meaning thereby a wheel having an erratic movement during rotation.

I may make use of the equivalents of the means described herein for obtaining the various adjustments since I do not wish to be understood as confining myself to what is shown and described.

I claim:

1. A sprinkler of the type described including a water conducting support, an arm rotatably mounted thereon on a substantially vertical axis and receiving water therefrom, a portion thereof being upwardly inclined at an angle to its plane of rotation, a bladed wheel carried by the arm at its discharge end for receiving against its blades a water jet from said arm, said wheel being also inclined upwardly, its axis of rotation cutting the axis of said rotation of said arm.

2. A sprinkler of the type described including a water conducting support, an arm rotatably mounted thereon and receiving water therefrom, a portion thereof being upwardly inclined at an angle to the plane of its rotation and having a discharge opening, a bladed wheel carried by the arm at its discharge end for receiving against its blades a water jet from said arm, said wheel being also inclined upwardly, its axis of rotation cutting the said axis of rotation of said arm, and said wheel being weighted outward from its center of rotation to unbalance it, said arm and its wheel being counterbalanced on the said support.

3. A sprinkler including a water supply arm, a support upon which the arm is mounted to rotate, said arm having a free end provided with a discharge opening, a mounting at the end of the arm near said opening, an unbalanced wheel rotatably mounted thereon adapted to be driven by a water stream issuing from said discharge opening, and means on the mounting to adjust the wheel in its own plane in the direction of the water stream issuing from said opening.

4. A sprinkler including a water supply arm, a water conducting support upon which the arm is mounted to rotate, said arm having a free end provided with a discharge opening, a mounting at the free end of the arm, an unbalanced wheel rotatably mounted thereon on an axis approaching the vertical adapted to be driven by a water stream issuing from said discharge opening, and means to adjust the wheel in its own plane in the direction of a water stream issuing from the discharge opening.

5. A sprinkler including a water supply arm, a support upon which the arm is mounted to rotate, said arm having a free end provided with a discharge opening, a mounting at the free end of the arm, a wheel rotatably mounted thereon unbalanced during rotation and adapted to be driven by a water stream issuing from said discharge opening, and means to adjust the wheel in its own plane in the direction of the water stream.

6. A sprinkler including a water supply arm, a support upon which the arm is mounted to rotate, said arm having a free end provided with a discharge opening, a mounting at the free end of the arm, an unbalanced wheel rotatably mounted thereon adapted to be driven by a water stream issuing from said discharge opening, means to adjust the wheel in its own plane in the direction of the water stream, and means also to adjust said wheel in a direction substantially at right angles to its said plane.

7. The combination with a support conducting water under pressure, an arm of two portions rotatably mounted on the support, said arm having a free end provided with a discharge opening and inclined upwardly at an angle to the plane of its rotation, a mounting at said free end of the arm, an unbalanced wheel rotatably carried on the mounting opposite the discharge opening, that portion of the arm having said mounting being adjustable about its axis with respect to the other portion thereof, and means to secure the two portions of said arm relatively.

8. The combination with a support conducting water under pressure, an arm of two portions rotatably mounted on the support and counter-balanced, said arm having a free end provided with a discharge opening, and inclined upwardly at an angle to the plane of its rotation, a mounting at the free end of the arm, an unbalanced wheel rotatably carried on the mounting opposite the discharge opening, that portion of the arm having said mounting being adjustable about its axis with respect to the other portion thereof, and means to secure the two portions of the arm relatively.

9. The combination with a support for conducting water under pressure, an arm rotatably mounted on the support and having a free end provided with a discharge opening, a nozzle on said free end including a passage whose axis lies at an angle to the axis of the bore of the arm, a mounting on the arm and an unbalanced wheel rotatably carried on the mounting opposite the nozzle, said nozzle adapted to be rotated upon the arm to direct a water stream therefrom at different angles with respect to the arm.

10. The combination with a support for conducting water under pressure, an arm rotatably mounted on the support and having a free discharge end, a nozzle on said free end including an angular passage, a mounting on the arm, an unbalanced wheel rotatably carried on the mounting opposite the nozzle, said nozzle adapted to be rotated upon the arm to direct a water stream therefrom at different angles, and means to adjust the wheel in either of two directions at right angles to one another and with respect to a water stream discharged from said nozzle.

In testimony whereof I affix my signature.

LEWEN R. NELSON.